(12) United States Patent
Caldwell et al.

(10) Patent No.: US 11,970,375 B2
(45) Date of Patent: Apr. 30, 2024

(54) PIPELAYER MACHINE WITH FORWARD TOWING WINCH CONFIGURATION

(71) Applicant: Caterpillar Inc., Peoria, IL (US)

(72) Inventors: Curtis John Caldwell, Metamora, IL (US); Donald L Vance, East Peoria, IL (US); Benjamin Barbier, Grenoble (FR)

(73) Assignee: Caterpillar Inc., Peoria, IL (US)

( * ) Notice: Subject to any disclaimer, the term of this patent is extended or adjusted under 35 U.S.C. 154(b) by 50 days.

(21) Appl. No.: 17/449,899

(22) Filed: Oct. 4, 2021

(65) Prior Publication Data

US 2023/0109258 A1 Apr. 6, 2023

(51) Int. Cl.
*B66C 23/44* (2006.01)
*B66C 23/76* (2006.01)
*F16L 1/06* (2006.01)

(52) U.S. Cl.
CPC .............. *B66C 23/44* (2013.01); *B66C 23/76* (2013.01); *F16L 1/065* (2013.01)

(58) Field of Classification Search
CPC ............ F16L 1/024; F16L 1/065; B66C 23/44
See application file for complete search history.

(56) References Cited

U.S. PATENT DOCUMENTS

| | | | | |
|---|---|---|---|---|
| 2,712,873 A | * | 7/1955 | Peterson | F16L 1/036 180/9.1 |
| 2,894,645 A | | 7/1959 | McCall et al. | |
| 2,991,890 A | * | 7/1961 | Kennedy | B66C 23/36 212/258 |
| 3,058,600 A | * | 10/1962 | Gosnell | B66C 23/36 212/245 |
| 3,236,391 A | * | 2/1966 | Kennedy | B66C 23/76 212/196 |
| 3,378,148 A | * | 4/1968 | Stanley | B66C 23/76 212/196 |
| 3,490,608 A | * | 1/1970 | Risk | B60P 1/5423 414/745.6 |
| 3,940,000 A | | 2/1976 | Mousel | |
| 4,216,869 A | * | 8/1980 | Grove | B66C 23/62 212/253 |
| 4,278,239 A | * | 7/1981 | Peterson | B66D 1/00 254/323 |
| 4,666,049 A | * | 5/1987 | Gilmore, Jr. | E02F 3/369 212/175 |

(Continued)

FOREIGN PATENT DOCUMENTS

| | | | | |
|---|---|---|---|---|
| GB | 597109 A | | 1/1948 | |
| GB | 1343803 A | * | 4/1971 | ............. B66C 23/36 |

(Continued)

*Primary Examiner* — Michael R Mansen
*Assistant Examiner* — Juan J Campos, Jr.
(74) *Attorney, Agent, or Firm* — Harrity & Harrity, LLP

(57) ABSTRACT

A pipelayer machine may comprise a machine chassis; a towing winch assembly coupled to the machine chassis; an operator cabin supported by the machine chassis; an engine supported by the machine chassis; and a boom coupled to the machine chassis. The pipelayer machine may comprise a front portion and a rear portion. The towing winch assembly may be provided in the front portion of the pipelayer machine. The operator cabin may be provided between the towing winch assembly and the engine.

20 Claims, 6 Drawing Sheets

(56) References Cited

U.S. PATENT DOCUMENTS

| | | | |
|---|---|---|---|
| 4,854,547 A * | 8/1989 | Oliphant | B66D 1/50 |
| | | | 254/326 |
| 5,392,936 A | 2/1995 | Solomon et al. | |
| 5,518,128 A | 5/1996 | Kroll et al. | |
| 6,616,397 B1 | 9/2003 | Lester | |
| 6,893,189 B2 | 5/2005 | Matsushita et al. | |
| 7,048,257 B2 | 5/2006 | Wentworth et al. | |
| 7,845,503 B2 | 12/2010 | Laurini | |
| 8,152,412 B2 | 4/2012 | Davis | |
| 9,617,126 B2 | 4/2017 | Uemura et al. | |
| 10,273,123 B2 | 4/2019 | Omori et al. | |
| 2004/0033109 A1* | 2/2004 | Gelmi | B66C 23/44 |
| | | | 405/174 |
| 2006/0245888 A1* | 11/2006 | Dietz | B66C 23/44 |
| | | | 414/563 |
| 2019/0023538 A1* | 1/2019 | Pletz | E21B 19/15 |

FOREIGN PATENT DOCUMENTS

| | | | |
|---|---|---|---|
| JP | 2737048 | B2 | 4/1998 |
| JP | 2004352467 | A | 12/2004 |
| JP | 2005298108 | A | 10/2005 |
| JP | 5121351 | B2 | 1/2013 |
| JP | 5476755 | B2 | 4/2014 |

\* cited by examiner

PIPELAYER MACHINE WITH FORWARD TOWING WINCH CONFIGURATION

TECHNICAL FIELD

The present disclosure relates generally to a pipelayer machine and, for example, to a pipelayer machine with a towing winch configuration.

BACKGROUND

A pipelayer is a machine that is used for installing large, heavy pipeline segments into and/or above ground. Currently, a towing winch of the pipelayer is provided in a rear portion of the pipelayer while an operator seat (of a stationary operator cabin) is facing a front portion of the pipelayer. The location of the towing winch, with respect to a direction of the operator seat, negatively impacts a towing operation involving the towing winch.

As an example, during the towing operation, an operator would need to twist and turn to face the rear portion of the pipelayer while the operator seat remains facing the front portion of the pipelayer. The operator would need to remain in a twisted and turned position during the towing operation. Remaining in the twisted and turned position for a prolonged period of time causes the operator to experience fatigue. The fatigue may decrease a measure of efficiency of operating the pipelayer.

U.S. Pat. No. 10,273,123 (the '123 patent) discloses a rough terrain crane equipped with a selective catalytic reduction (hereinafter, referred to as "SCR"). The '123 patent discloses that the upper working unit 12 includes a slewing base 22 having a rear end on which a counterweight is disposed. The '123 patent further discloses that the boom device 23 is connected to the slewing base 22 via a boom-root fulcrum pin (not illustrated). The '123 patent also discloses that the boom device 23 has a winch 27 that is driven by a hydraulic motor (not illustrated), and operating of the winch 27 causes a work to move up and down.

While the '123 patent discloses a winch, the '123 patent specifically discloses the winch in connection with the boom device. Therefore, the '123 patent does not disclose a towing winch.

The pipelayer machine of the present disclosure solves one or more of the problems set forth above and/or other problems in the art.

SUMMARY

In some implementations, a pipelayer machine includes a machine chassis; a towing winch assembly coupled to the machine chassis; an operator cabin supported by the machine chassis; an engine supported by the machine chassis; and a boom coupled to the machine chassis, wherein the pipelayer machine comprises a front portion and a rear portion, wherein the towing winch assembly is provided in the front portion of the pipelayer machine, and wherein the operator cabin is provided between the towing winch assembly and the engine.

In some implementations, a machine includes a machine chassis; a towing winch assembly coupled to the machine chassis; an operator cabin supported by the machine chassis; a boom coupled to the machine chassis; and a hook component connected to the boom via one or more lifting cables, wherein the machine comprises a front portion and a rear portion, wherein the towing winch assembly is provided in the front portion of the machine, and wherein the machine is configured to facilitate a replacement of the towing winch assembly with a weight assembly.

In some implementations, a pipelayer machine includes a machine chassis; an operator cabin including a seat assembly; a weight assembly coupled to the machine chassis; an engine supported by the machine chassis; and a boom coupled to the machine chassis, wherein the pipelayer machine comprises a front portion and a rear portion, wherein the weight assembly is provided in the front portion of the pipelayer machine, wherein the weight assembly is interchangeable with a towing winch assembly, and wherein the seat assembly is configured to face the front portion of the pipelayer machine.

DETAILED DESCRIPTION

The present disclosure is directed to facilitating an operation of a pipelayer machine using a towing winch assembly of the pipelayer machine, thereby increasing a measure of efficiency when performing the operation using the towing winch assembly. For example, the towing winch assembly is provided in a front portion of the pipelayer machine (as opposed to a rear portion of existing pipelayer machines).

By providing the towing winch assembly in a front portion of the pipelayer machine, an operator of the pipelayer machine would no longer need to twist and turn, for a prolonged period of time, to face a rear portion of the pipelayer machine to perform an operation using the towing winch assembly. Instead, the operator may remain facing the front portion of the pipelayer machine, in a seat assembly that faces the front portion, while performing the operation.

Accordingly, providing the towing winch assembly in the front portion of the pipelayer machine may improve ergonomics associated with performing the operation, thereby reducing a measure of fatigue experienced by the operator during the operation. By reducing the measure of fatigue, a measure of efficiency of performing the operation may be increased.

The term "machine" may refer to a device that performs an operation associated with an industry such as, for example, mining, construction, farming, transportation, or another type of industry. Moreover, one or more implements may be connected to the machine.

Figure 1:
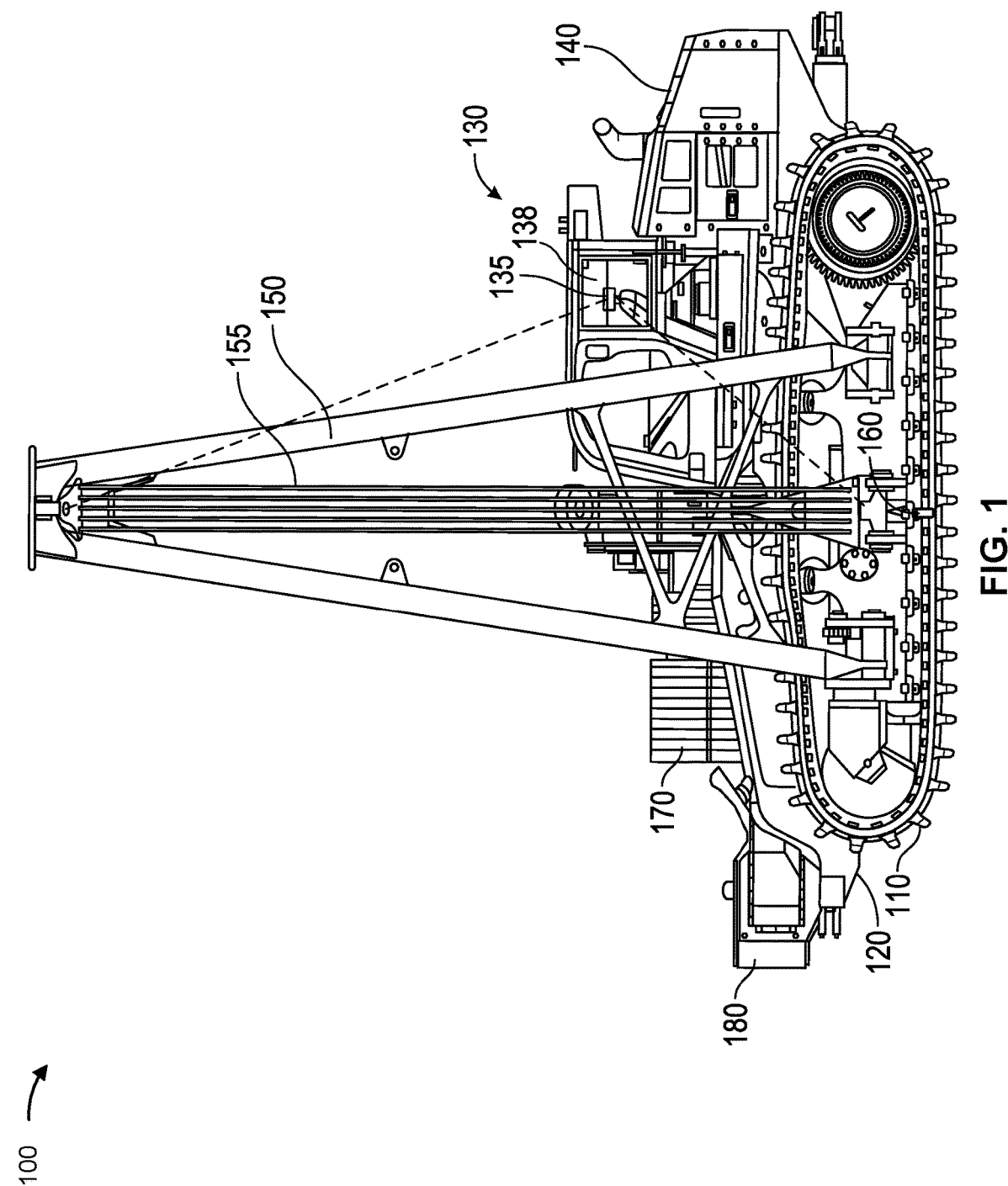
FIG. 1 is a diagram of a side view of an example machine described herein.

FIG. 1 is a diagram of a side view of an example machine 100 described herein. As shown in FIG. 1, machine 100 is embodied as a pipelayer machine. While FIG. 1 illustrates a pipelayer machine, the present disclosure may be applicable to another type of machine with a lifting assembly.

As shown in FIG. 1, machine 100 includes ground engaging members 110, a machine chassis 120, an operator cabin 130, a power source 140, a boom 150, a hook component 160, a counterweight assembly 170, and a towing winch assembly 180. As shown in FIG. 1, ground engaging members 110 include tracks that are composed of a series of interlinked track shoes in an oval track and/or high drive configuration. Alternatively, ground engaging members 110 may include wheels, rollers, tires, tracks, among other examples.

As shown in FIG. 1, machine chassis 120 may be provided between ground engaging members 110 (between referring to the widthwise direction of machine 100 relative to forward and backward travel). In some implementations, machine 100 may be configured such that a location of a center of gravity of machine 100 is lower than a location of a center of gravity of existing pipelayer machines. Machine chassis 120 may be configured to support operator cabin 130 and power source 140. Operator cabin 130 may include an integrated display (not shown) and operator controls (not shown), such as, for example, integrated joysticks. Operator controls may include one or more input components to generate signals to control movement of machine 100 (e.g., to control a movement of ground engaging members 110, boom 150, hook component 160, among other components of machine 100).

Operator cabin 130 may further include seat assembly 135 and an opening, such as window 138. Seat assembly 135 may be configured to face a front portion of machine 100. Operator cabin 130 may be configured to be stationary with respect to machine chassis 120 and ground engaging members 110. As shown in FIG. 1, operator cabin 130 may be provided between power source 140 and towing winch assembly 180.

Power source 140 may include an engine. As an example, power source 140 may include an internal combustion engine. Additionally, or alternatively, power source 140 may include a battery, a fuel cell, among other examples. As shown in FIG. 1, power source 140 may be provided in a rear portion of machine 100. For example, power source 140 may be provided adjacent to a rear surface (not shown) of operator cabin 130. By providing power source 140 in the rear portion of machine 100, a visibility (of the operator of machine 100) to side areas and front areas of machine 100 may be increased.

The increased visibility to the side areas and the front areas may decrease a frequency of stopping machine 100 to ensure that no obstructions (e.g., objects, individuals, among other examples) are provided in a path of machine 100 during an operation of machine 100. Accordingly, the increased visibility to the side areas and the front areas may increase a measure of efficiency of operating machine 100.

In some situations, providing power source 140 in the rear portion of machine 100 may increase a lifting capacity of machine 100 with respect to a lifting capacity of existing pipelayer machines. For example, the lifting capacity of machine 100, during lifting operations performed on a declined surface, may be approximately 26% greater than the lifting capacity of existing pipelayer machines during lifting operations performed on the declined surface. As another example, the lifting capacity of machine 100, during lifting operations performed on an inclined surface, may be approximately 30% greater than the lifting capacity of existing pipelayer machines during lifting operations performed on the inclined surface.

Figure 3:
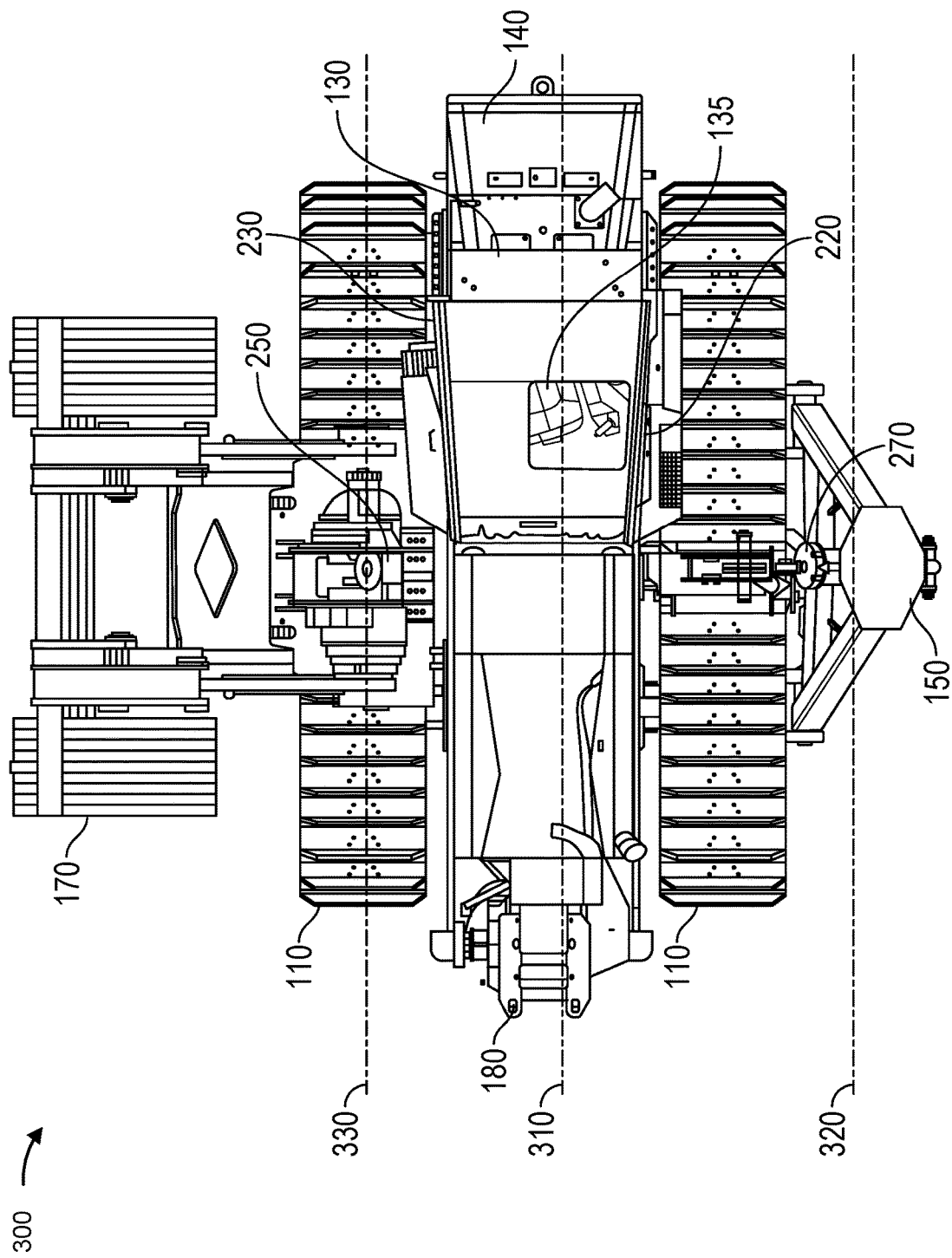
FIG. 3 is a diagram of a top view of an example machine described herein.

Boom 150 may be supported by machine chassis 120. Boom 150 may be configured to extend to a particular height at a particular angle from machine 100 (e.g., during a lifting operation performed by machine 100). As shown in FIG. 1, boom 150 may be provided adjacent to a first lateral surface of operator cabin 130 and forward with respect to seat assembly 135. For example, seat assembly 135 may be provided intersecting a first plane (as shown in FIG. 3) and boom 150 may be provided intersecting a second plane (not shown) that is parallel to the first plane. Boom 150 may be provided, in the second plane, adjacent to the first lateral surface of the operator cabin 130 and forward with respect to seat assembly 135.

By providing boom 150 forward with respect to seat assembly 135, a visibility (of the operator of machine 100) to side areas of machine 100 may be increased. For example, a visibility to hook component 160 and other components associated with boom 150 may be increased. The increased visibility to the side areas (including hook component 160 and the other components associated with boom 150) may increase a measure of efficiency of operating machine 100, as explained above. For example, a measure of efficiency of performing a task using hook component 160 may be increased.

One or more lifting cables 155 may extend from a body of machine 100 to hook component 160 via boom 150 to assist in lifting and/or placing a load. Hook component 160 may include a cradle and/or other mechanism for securing, carrying, holding, lifting, and/or placing a pipeline segment. Hook component 160 may be configured to secure or move the load.

Figure 2:
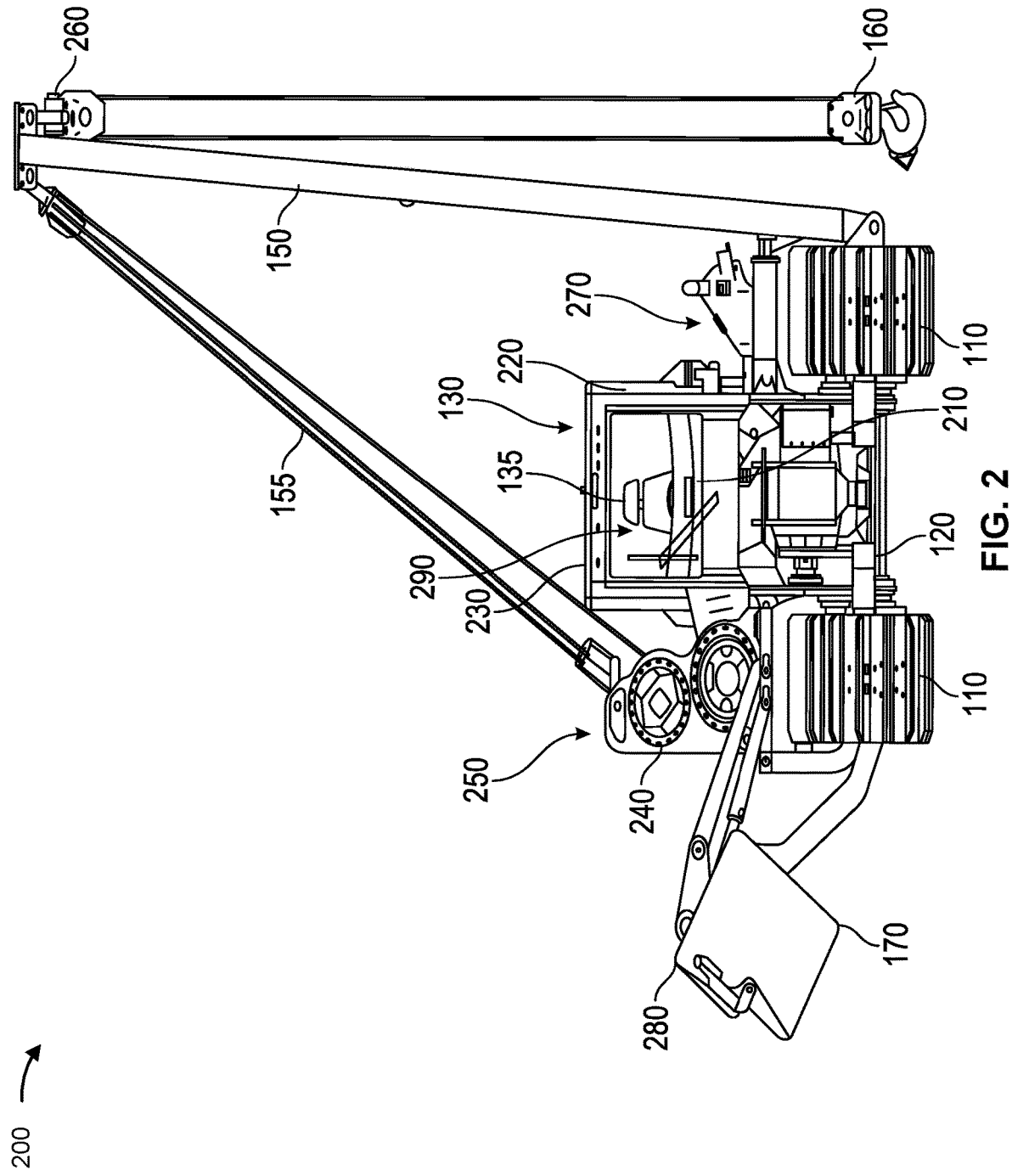
FIG. 2 is a diagram of a front view of an example machine described herein.

Counterweight assembly 170 may be supported by machine chassis 120. Counterweight assembly 170 may be configured to counterbalance forces created as boom 150 is extended during a lifting operation performed by machine 100. For example, counterweight assembly 170 may be configured to extend away from machine chassis 120 during the lifting operation. Counterweight assembly 170 may be provided adjacent to a second lateral surface (as shown in FIG. 2) of operator cabin 130 and forward with respect to seat assembly 135, as explained below.

Towing winch assembly 180 may be coupled to machine chassis 120. Towing winch assembly 180 may be configured to perform lifting and towing operations. Towing winch assembly 180 may include a drum and a cable wound about the drum. As shown in FIG. 1, towing winch assembly 180 may be provided in a front portion of machine 100.

By providing towing winch assembly 180 in the front portion of machine 100 and providing power source 140 in the rear portion of machine 100, a visibility (of the operator of machine 100) to towing winch assembly 180 may be increased. The increased visibility to towing winch assembly 180 may decrease a frequency of stopping machine 100 and a frequency of the operator turning to face the rear portion of machine 100 to ensure that no obstructions (e.g., objects, individuals, among other examples) are within a path of machine 100 during a lifting operation or a towing operating of machine 100. Accordingly, the increased visibility to towing winch assembly 180 may increase a measure of efficiency of operating machine 100 during lifting operations and towing operations that involve towing winch assembly 180. Additionally, the weight of towing winch assembly 180 helps to counterbalance the weight of power source 140, improving the overall balance of the machine 100. Furthermore, towing winch assembly 180 may be interchangeable with a weight assembly to provide a consistent machine balance and, accordingly, provide a consistent operator feel for machine 100.

Towing winch assembly 180 may be configured to be interchangeable with a weight assembly, as explained below. For example, machine 100 may be configured to facilitate a replacement of towing winch assembly 180 with the weight assembly. In other words, machine 100 may be configured to allow for an easy replacement of towing winch assembly 180 with the weight assembly. For instance, towing winch assembly 180 may be coupled to machine chassis 120 using one or more fasteners to allow for an easy replacement of towing winch assembly 180 with the weight assembly. As an example, towing winch assembly 180 may be bolted to a front bulkhead associated with machine chassis 120. The weight assembly may be coupled to machine chassis 120 in a similar manner.

As indicated above, FIG. 1 is provided as an example. Other examples may differ from what was described in connection with FIG. 1. The number and arrangement of components shown in FIG. 1 are provided as an example. In practice, there may be additional components, fewer components, different components, or differently arranged components than those shown in FIG. 1.

FIG. 2 is a diagram of a front view of example machine 100 described herein. Some elements of machine 100 have been described above in connection with FIG. 1. As shown in FIG. 2, operator cabin 130 may include a front surface 210, a first lateral surface 220, and a second lateral surface 230 opposite the first lateral surface 220.

As shown in FIG. 2, machine 100 may include a winch 240, a winch tower 250, a pulley 260, and a fairlead tower 270. Winch 240, winch tower 250, pulley 260, and/or fairlead tower 270 may be associated with boom 150 and hook component 160. In some examples, winch 240, winch tower 250, pulley 260, and/or fairlead tower 270 may be used during a lifting operation that involves boom 150 and hook component 160. For example, one or more lifting cables 155 may extend from winch 240 through pulley 260 to hook component 160 via boom 150 in order to assist in lifting, securing, and/or placing a load. As shown in FIG. 2, winch tower 250 may be provided adjacent to counterweight assembly 170 and fairlead tower 270 may be provided adjacent to boom 150.

As shown in FIG. 2, boom 150, hook component 160, and fairlead tower 270 may be provided adjacent to first lateral surface 220 while counterweight assembly 170 and winch tower 250 may be provided adjacent to second lateral surface 230. In some implementations, boom 150, hook component 160, and fairlead tower 270 may be provided adjacent to second lateral surface 230 while counterweight assembly 170 and winch tower 250 may be provided adjacent to first lateral surface 220.

As explained above in connection with FIG. 1, counterweight assembly 170 may be configured to extend away from machine chassis 120. As shown in FIG. 2, when counterweight assembly 170 is extended away from machine chassis 120, a top surface 280 of counterweight assembly 170 may be provided below a top portion 290 of seat assembly 135. By providing the top surface 280 of counterweight assembly 170 below the top portion 290 of seat assembly 135, a visibility (of the operator of machine 100) to side surfaces (e.g., adjacent to counterweight assembly 170) may be increased. Accordingly, the increased visibility to the side surfaces may increase a measure of efficiency of operating machine 100 during lifting operations and towing operations associated with extending counterweight assembly 170.

As indicated above, FIG. 2 is provided as an example. Other examples may differ from what was described in connection with FIG. 2. The number and arrangement of components shown in FIG. 2 are provided as an example. In practice, there may be additional components, fewer components, different components, or differently arranged components than those shown in FIG. 2.

FIG. 3 is a diagram of a top view of example machine 100 described herein. Some elements of machine 100 have been described above in connection with FIG. 1 and FIG. 2. As shown in FIG. 3, operator cabin 130 may be provided in a first plane 310 that is horizontal with respect to a ground surface on which machine 100 is provided. Boom 150 (along with hook component 160, and fairlead tower 270) may be provided in a second plane 320 that is parallel to first plane 310. Winch tower 250 may be provided in a third plane 330 that is parallel to first plane 310.

As shown in FIG. 3, fairlead tower 270 (and hook component 160) may be provided forward with respect to seat assembly 135. By providing fairlead tower 270 and hook component 160 forward with respect to seat assembly 135, a visibility (of the operator of machine 100) to fairlead tower 270, hook component 160, and side areas adjacent to boom 150 may be increased. Accordingly, a measure of efficiency of operating boom 150 and hook component 160 may be increased, in manner similar to the manner described above.

As shown in FIG. 3, winch tower 250 may be provided forward with respect to seat assembly 135. By providing winch tower 250 forward with respect to seat assembly 135, a visibility (of the operator of machine 100) to winch tower 250 and side areas adjacent to winch tower 250 may be increased. Accordingly, a measure of efficiency of operating boom 150 and hook component 160 may be increased, in manner similar to the manner described above.

As indicated above, FIG. 3 is provided as an example. Other examples may differ from what was described in connection with FIG. 3. The number and arrangement of components shown in FIG. 3 are provided as an example. In practice, there may be additional components, fewer components, different components, or differently arranged components than those shown in FIG. 3.

Figure 4:
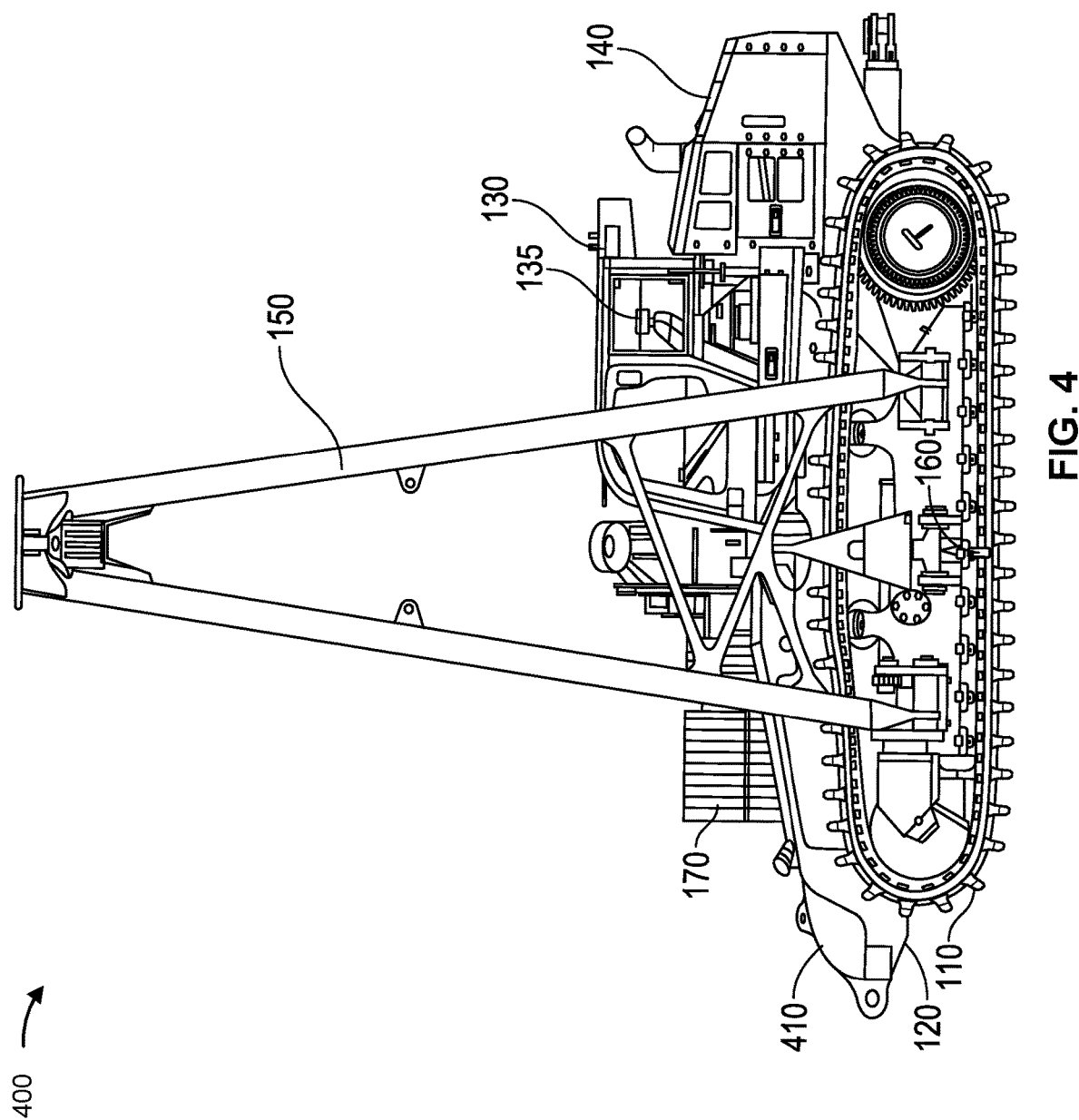
FIG. 4 is a diagram of a side view of an example machine described herein.

FIG. 4 is a diagram of a side view of example machine 100 described herein. Some elements of machine 100 have been described above in connection with FIG. 1 and FIG. 2. As shown in FIG. 4, towing winch assembly 180 has been replaced with a weight assembly 410. In some implementations, a weight of weight assembly 410 may be substantially equal to a weight of towing winch assembly 180. Additionally, or alternatively, dimensions of weight assembly 410 may be substantially equal to dimensions of towing winch assembly 180. For example, a width of weight assembly 410 may be substantially equal to a width of towing winch assembly 180, a height of weight assembly 410 may be substantially equal to a height of towing winch assembly 180, among other examples. The weight and/or the dimensions of weight assembly 410 may be configured to provide a consistent feel of machine 100 to the operator (e.g., to prevent the operator from recalibrating control of different components of machine 100). Weight assembly 410 may comprise a metal, a rubber material, a combination of materials, among other examples.

As indicated above, FIG. 4 is provided as an example. Other examples may differ from what was described in connection with FIG. 4. The number and arrangement of components shown in FIG. 4 are provided as an example. In practice, there may be additional components, fewer components, different components, or differently arranged components than those shown in FIG. 4.

Figure 5:
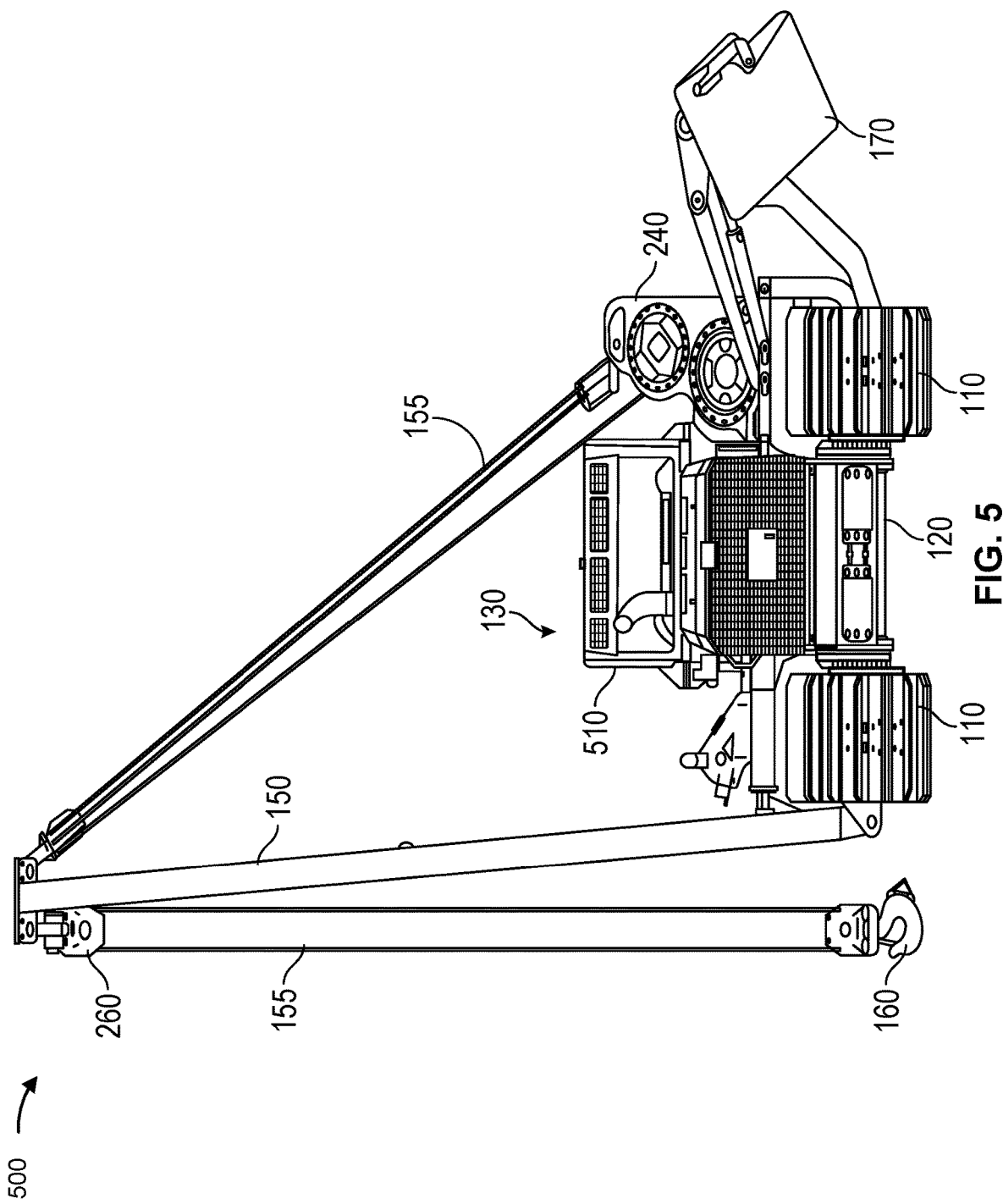
FIG. 5 is a diagram of a rear view of an example machine described herein.

FIG. 5 is a diagram of a rear view of example machine 100 described herein. Some elements of machine 100 have been described above in connection with FIG. 1 and FIG. 2. As shown in FIG. 5, operator cabin 130 include a rear surface 510.

As indicated above, FIG. 5 is provided as an example. Other examples may differ from what was described in connection with FIG. 5. The number and arrangement of components shown in FIG. 4 are provided as an example. In practice, there may be additional components, fewer components, different components, or differently arranged components than those shown in FIG. 5.

Figure 6:
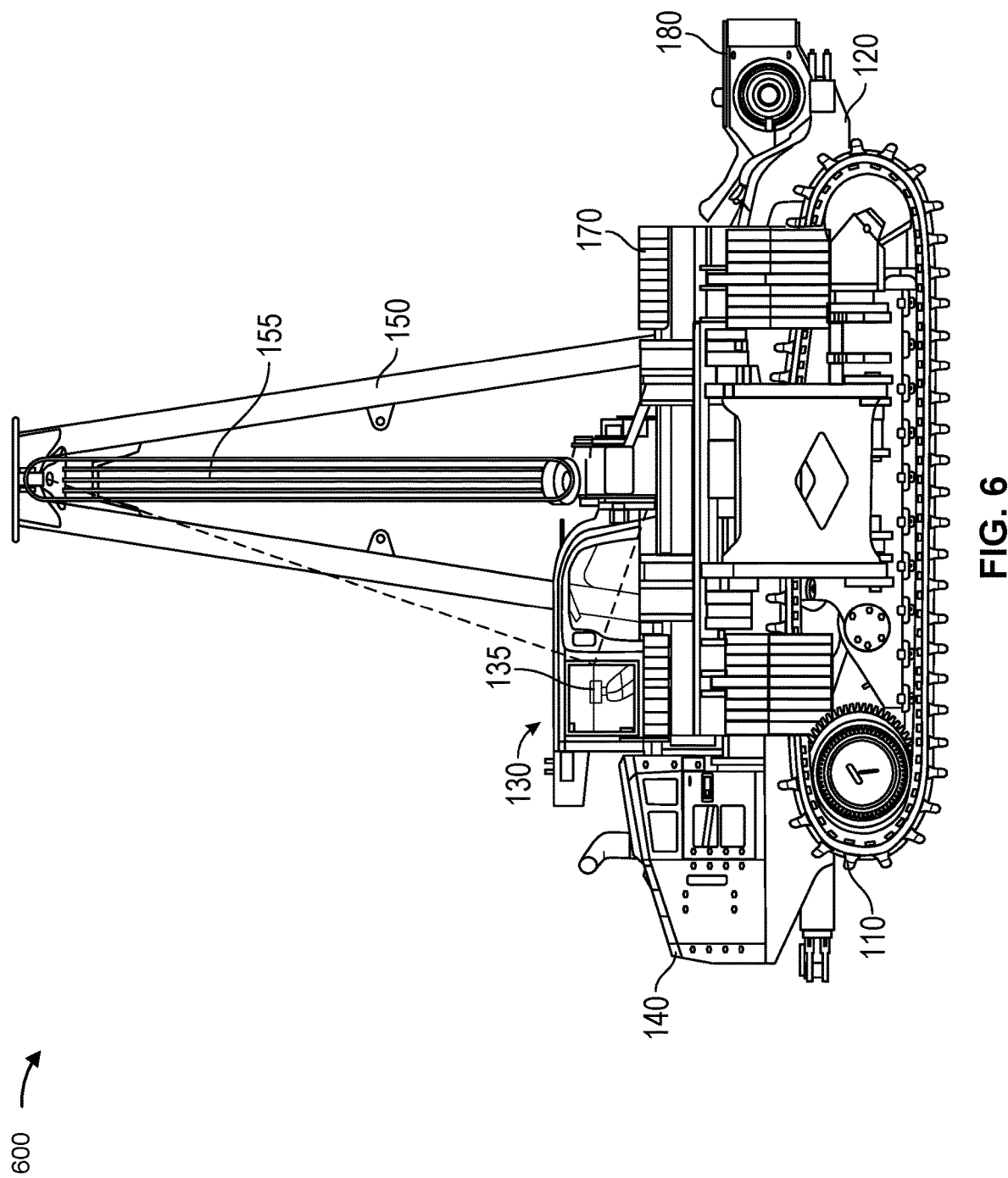
FIG. 6 is a diagram of a side view of an example machine described herein.

FIG. 6 is a diagram of a side view of example machine 100 described herein. Some elements of machine 100 have been described above in connection with FIG. 1 and FIG. 2. FIG. 6 illustrates an increased visibility (of the operator of machine 100) to winch tower 250 and to side areas adjacent to winch tower 250.

As indicated above, FIG. 6 is provided as an example. Other examples may differ from what was described in connection with FIG. 6. The number and arrangement of components shown in FIG. 6 are provided as an example. In practice, there may be additional components, fewer components, different components, or differently arranged components than those shown in FIG. 6.

INDUSTRIAL APPLICABILITY

The present disclosure is directed to facilitating an operation of a pipelayer machine using a towing winch assembly of the pipelayer machine, thereby increasing a measure of efficiency when performing the operation using the towing winch assembly. For example, the towing winch assembly is provided in a front portion of the pipelayer machine (as opposed to a rear portion of existing pipelayer machines).

For existing pipelayer machines (with stationary operator cabins), the towing winch assembly is provided in a rear portion of the existing pipelayer machines. Accordingly, an operator would need to remain in a twisted and turned position during a towing operation. Remaining in the twisted and turned position for a prolonged period of time causes the operator to experience fatigue. The fatigue may decrease a measure of efficiency of operating the existing pipelayer machines.

In contrast, by providing the towing winch assembly in the front portion of the pipelayer machine, an operator of the pipelayer machine would no longer need to twist and turn, for a prolonged period of time, to face a rear portion of the pipelayer machine to perform an operation using the towing winch assembly. Instead, the operator may remain facing the front portion of the pipelayer machine, in a seat assembly that faces the front portion, while performing the operation. Accordingly, providing the towing winch assembly in a front portion of the pipelayer machine may improve ergonomics associated with performing the operation, thereby reducing a measure of fatigue experienced by the operator during the operation. By reducing the measure of fatigue, a measure of efficiency of performing the operation may be increased.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A pipelayer machine, comprising:
   a machine chassis;
   a towing winch assembly coupled to the machine chassis;
   an operator cabin, supported by the machine chassis, comprising:
      a seat assembly of the operator cabin, and
      an opening of the operator cabin;
   an engine supported by the machine chassis;
   a boom coupled to the machine chassis; and
   a winch tower associated with the boom,
      wherein the pipelayer machine comprises:
         a front portion defined in a direction of forward travel of the machine chassis, and
         a rear portion defined in a direction of reverse travel of the machine chassis,
      wherein the towing winch assembly is provided in the front portion of the pipelayer machine,
      wherein the operator cabin is provided between the towing winch assembly and the engine,
      wherein the towing winch assembly is entirely in front of the operator cabin,
      wherein the winch tower is provided between the towing winch assembly and the seat assembly of the operator cabin,
      wherein the boom is provided adjacent to a lateral surface that is on same side as the opening of the operator cabin,
      wherein the opening of the operator cabin is adjacent to a rear side of the operator cabin,
      wherein a section of the boom includes any portion of the boom that is above a bottom of the opening of the operator cabin, and
      wherein an entirety of the section of the boom is entirely in front of an entirety of the opening of the operator cabin.

2. The pipelayer machine of claim 1, wherein the operator cabin is stationary with respect to the machine chassis, and
   wherein the seat assembly is configured to face the front portion of the pipelayer machine.

3. The pipelayer machine of claim 1,
wherein the seat assembly is provided in a first plane,
wherein the boom is provided in a second plane,
wherein the boom is forward with respect to the seat assembly, and
wherein the second plane is parallel to the first plane.

4. The pipelayer machine of claim 1, further comprising:
a counterweight assembly provided adjacent to a lateral side of the operator cabin,
wherein the counterweight assembly is configured to be extended away from the machine chassis, and
wherein, when the counterweight assembly is extended away from the machine chassis, a top surface of the counterweight assembly is provided below a top portion of the seat assembly.

5. The pipelayer machine of claim 1,
wherein a weight of the towing winch assembly is configured to counterbalance a weight of the engine.

6. The pipelayer machine of claim 1, further comprising:
ground engaging members,
wherein the machine chassis is provided between the ground engaging members.

7. The pipelayer machine of claim 1, further comprising:
a hook component connected to the boom via one or more lifting cables,
wherein the seat assembly is provided in a first plane,
wherein the hook component is provided in a second plane,
wherein the hook component is forward with respect to the seat assembly, and
wherein the second plane is parallel to the first plane.

8. The pipelayer machine of claim 1, wherein the opening of the operator cabin is a window.

9. A machine, comprising:
a machine chassis;
a towing winch assembly coupled to a front of the machine chassis,
wherein the front of the machine chassis is defined in a direction of forward travel of the machine chassis;
an operator cabin, supported by the machine chassis, comprising:
a seat assembly of the operator cabin, and
an opening of the operator cabin;
a boom coupled to the machine chassis;
a hook component connected to the boom via one or more lifting cables; and
a winch tower associated with the boom and the hook component,
wherein the winch tower is provided between towing winch assembly and the seat assembly of the operator cabin, wherein the boom is provided adjacent to a lateral surface that is on same side as the opening of the operator cabin,
wherein the opening of the operator cabin is adjacent to a rear side of the operator cabin,
wherein a section of the boom includes any portion of the boom that is above a bottom of the opening of the operator cabin, and
wherein an entirety of the section of the boom is entirely in front of an entirety of the opening of the operator cabin.

10. The machine of claim 9, further comprising:
a counterweight assembly,
wherein the counterweight assembly is provided adjacent to a lateral side of the operator cabin.

11. The machine of claim 9, further comprising ground engaging members,
wherein the machine chassis is provided between the ground engaging members.

12. The machine of claim 9, wherein the seat assembly is configured to face the front of the machine.

13. The machine of claim 9,
wherein the seat assembly is provided in a first plane,
wherein the hook component is provided in a second plane,
wherein the hook component is forward with respect to the seat assembly, and
wherein the second plane is parallel to the first plane.

14. The machine of claim 9,
wherein the seat assembly is provided in a first plane,
wherein the boom is provided in a second plane,
wherein the boom is forward with respect to the seat assembly, and
wherein the second plane is parallel to the first plane.

15. The machine of claim 9, further comprising an engine,
wherein the operator cabin is provided between the engine and the towing winch assembly.

16. A pipelayer machine, comprising:
a machine chassis;
an operator cabin including:
a seat assembly, and
an opening;
a weight assembly coupled to the machine chassis;
an engine supported by the machine chassis; and
a boom coupled to the machine chassis; and
a winch tower associated with the boom,
wherein the pipelayer machine comprises a front portion and a rear portion,
wherein the weight assembly is provided in the front portion of the pipelayer machine,
wherein the weight assembly is interchangeable with a towing winch assembly that is entirely in front of the operator cabin,
wherein the winch tower is provided between the seat assembly and one of the towing winch assembly or the weight assembly,
wherein the boom is provided adjacent to a lateral surface that is on same side as the opening,
wherein the opening is adjacent to a rear side of the operator cabin,
wherein a section of the boom includes any portion of the boom that is above a bottom of the opening,
wherein an entirety of the section of the boom is entirely in front of an entirety of the opening, and
wherein the seat assembly is configured to face the front portion of the pipelayer machine.

17. The pipelayer machine of claim 16, wherein the operator cabin is provided between the weight assembly and the engine.

18. The pipelayer machine of claim 16, wherein the pipelayer machine is configured to facilitate a replacement of the weight assembly with the towing winch assembly.

19. The pipelayer machine of claim 16, further comprising:
a counterweight assembly,
wherein a top surface of the counterweight assembly is provided below a top portion of the seat assembly.

20. The pipelayer machine of claim 16, further comprising:
   a hook component connected to the boom via one or more lifting cables,
      wherein the seat assembly is provided in a first plane,
      wherein the boom and the hook component are provided in a second plane,
      wherein the boom and the hook component are forward with respect to the seat assembly, and
      wherein the second plane is parallel to the first plane.

* * * * *